Aug. 20, 1968   R. W. BATTEN   3,397,601
UNITIZED BRAKE FOR A FASTENER-SETTING DRIVER
Filed April 18, 1966
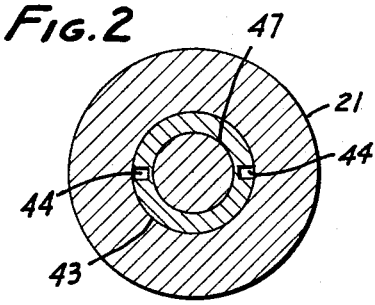
Fig. 1
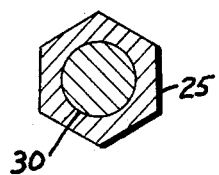
Fig. 3
Fig. 2
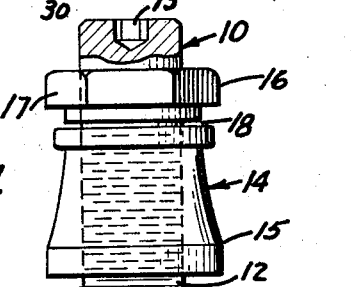
Fig. 4
INVENTOR.
RONALD W. BATTEN
BY
Angus & Mon
ATTORNEYS.

United States Patent Office 3,397,601
Patented Aug. 20, 1968

3,397,601
UNITIZED BRAKE FOR A FASTENER-SETTING DRIVER
Ronald W. Batten, Torrance, Calif., assignor to Hi-Shear Corporation, Torrance, Calif., a corporation of California
Filed Apr. 18, 1966, Ser. No. 543,223
18 Claims. (Cl. 81—56)

ABSTRACT OF THE DISCLOSURE

This disclosure relates to a brake for use in a fastener-setting driver and to a fastener-setting driver incorporating a brake which includes a unitary assembly of brake bodies and brake load means which is adapted to be fitted to the driver frame, there to provide braking means at one end for one of two elements of a fastener set by counter-rotation, such as a nut and a bolt. The device is characterized by the provision of two brake bodies which are forced together by brake load means, the bodies and brake load means being held together as a unitary assembly that is readily removed and replaced when different levels of brake load, or a newly calibrated load, are desired.

---

This application relates to a brake for use in a fastener-setting driver.

There is a class of fastener exemplified by United States patent to Wing No. 2,940,495, issued June 14, 1960, in which a collar is driven onto a pin and set to a given torque, at which torque level a section of the collar which carries driver-engaging surfaces through which the fastener is driven shears loose at a weakened section to leave the collar set at the predetermined torque, and preventing further application of torque to the collar. It is also customary for a fastener to be driven from only one end, by using counter-rotating means. It is evident that forces are built up in the frame of the driving tool which are the result of the applied torque and which forces will let loose with a sharp peak load when the section shears off. It is also evident that it is possible for excessive forces to be generated should the collar not shear at the correct torque. It is also obvious that this device can be used on plain nuts and bolts, in which case the counter-rotating element which ordinarily simply holds the pin against rotation could be damaged by excessive torque or shock loads which might be applied to it. For this reason, brakes (or clutches) of one kind or another have been placed in the wrench system so that one of the rotatable elements is restrained against rotation (preferably the element which restrains rotation of the pin) up to a given torque level at which time it is itself free to rotate subject to the braking resistance developed by the brake. In this manner, there can never be an overload on what is usually a relatively small Allen Head wrench. An example of a wrench including such braking means is shown in United States Patent to Batten No. 3,247,741, issued Apr. 26, 1966.

Previously known wrenches which include braking means have involved certain practical problems which include the difficulty of standardizing the braking force in the shop, and the difficulty of adjusting it for different sizes of fasteners which have different torque levels. It is an object of this invention to provide a brake in cartridge form which can readily be applied to the frame of a fastener-setting driver, there reliably to exert its braking force and at a level which is predetermined in the tool room. Because the unitary assembly is readily removed and replaced, the tool can readily be set to braking levels within a wide range of values, or replaced with a more recently calibrated brake at the same level.

A brake according to this invention is used in combination with a fastener-setting driver which includes a driven rotatable element and a restrained rotable element, each of these elements being adapted to engage a respective portion of a fastener to be set wherein relative counter-rotation between the two elements sets the fastener. The driver includes a frame. The brake comprises a pair of brake bodies with a non-circular brake surface on each of the bodies. These brake surfaces are so disposed and arranged as to abut each other in surface-to-surface engagement. Rotational restraint means restricts a first one of said bodies against rotation relative to the frame. The second of the brake bodies is free to rotate relative to the frame, subject to restraint by the braking resistance developed between the brake surfaces. Brake load means engages the brake bodies and forces the brake surfaces against each other. The brake bodies and brake load means form a unitary assembly. Means is provided for engaging a second of the brake bodies to the restrained rotatable element.

According to a preferred but optional feature of the invention, the brake load means comprises a spring disposed in opposition to the two bodies.

According to still another preferred but optional feature of the invention, brake bias means is disposed between structure connected to the frame and the unitary assembly so as to bias the unitary assembly toward one of the elements, the unitary assembly being withdrawable in opposition to the brake bias means in order to permit the restrained rotatable element to shift axially relative to the driven rotatable element.

The above and other features of this invention will be fully understood from the following detailed description and the accompanying drawings in which:

FIG. 1 is a side elevation, partly in cutaway cross-section, and partly in schematic notation, showing the presently preferred embodiment of the invention;

FIGS. 2 and 3 are cross-sections taken at lines 2—2 and 3—3 of FIG. 1; and

FIG. 4 is an elevation, partly in cutaway cross-section, showing a fastener of the type generally driven by the tool of FIG. 1.

Although the invention is useful in driving any class of fastener in which two parts are assembled by relative rotation, such as a common nut and bolt, the most characteristic use of this device is to set the fastener shown in FIG. 4. This fastener includes a pin 10 having a shank 11 with a thread 12 thereon and a non-cylindrical recess 13 in the end thereof. The usual recess is either square or hexagonal so as to receive and engage with an appropriately shaped element.

A collar 14 is adapted to be threaded onto pin 10. This collar is the type shown in Wing Patent No. 2,940,495. It includes a base section 15 and a driven section 16. The driven section 16 includes a plurality of wrench-engaging surfaces 17 which are usually in a hexagonal array so as to fit into a hexagonal socket. A shear groove 18 is formed between the base section and the driven section and is the sector of least cross-section of the collar so that when the base section is pressed against a workpiece and torque builds up, the collar will shear at the shear groove when the inherently predetermined torque is reached, after which event the driven section can no longer exert torque on the base section. The driven section is counter-bored so that it falls loose from the pin.

This fastener can therefore be driven from its upper end by inserting a wrench into recess 13 and applying another wrench to surfaces 17 and then counter-rotating the wrenches. The term "counter-rotating" is used herein to impart relative rotational movement between the pin and the collar, although both wrenches need not actually rotate relative to the frame. In fact, it is customary for the pin to be restrained against rotation at operative torque levels.

Driver 20 includes a frame 21 driven by a portable power tool 22, such as a hand-held motor with a pistol grip, which is attached to the frame and engaged to an input gear 23. Input gear 23 drives a gear train 24 whose output is applied to shaft 25. Shaft 25 is journaled to the frame by bearing 26 and extends downwardly to couple to a socket 27 which has wrenching surfaces 33. The socket is snapped onto shaft 24 and keyed thereto so as to rotate therewith. The function of power tool 22 is to rotate shaft and socket 27, which, when engaged to the collar, will turn the same upon the pin. Shaft 25 is sometimes called a "driven rotatable element."

A second wrench 30 (sometimes called a "restrained rotatable element") extends through a cylindrical passage 31 in shaft 25 so as to be freely rotatable therein. It projects beyond the end of shaft 25 into a cavity 32 in socket 27. It has wrench surfaces at its end adapted to engage in the recess 13 of the pin. It will now be seen that the shaft 25 with its socket is rotatable around wrench 30, which is restrained. The means for restraint will now be described, this means constituting brake 35 which is preferably in capsule form so as readily to be removed and replaced. The upper (or inner) end of wrench 30 has a hexagonal recess 36 to receive a tongue 37. The brake has an outer case 38 with holes 39 therethrough. The frame has an upstanding neck 40 with holes 41 therethrough, holes 39 and 41 being alignable so as to receive pins 42 which thereby hold the case to the frame.

A first brake body 43 has a pair of external axially-extending slots 44 into which pins 42 project. It will thereby be seen that brake body 43 may be axially moved upwardly and downwardly in FIG. 1 while it is restrained against rotation by the pins, the pins serving the dual purpose of providing this rotational restraint for the first brake body and also for holding the case to the frame. Removal and replacement of the entire assembly may be accomplished by removing pins 42 and replacing this or any other case and its contents to the configuration shown in FIG. 1. The first brake body also includes a brake surface 45 on the inside. A shoulder 46 limits the downward motion of the first brake body by engaging the pins.

A second brake body 47 includes a brake surface 48 which is adapted to engage brake surface 45. The two brake surfaces are non-cylindrical and preferably conical in shape. Lubricant grooves 49 are formed in the surface of the second brake surface so as to standardize the reaction between the two brake surfaces. Any suitable grease may be placed in these grooves so as to keep the surfaces lubricated. Tongue 37 is integral with the second brake body and projects downwardly to engage the recess in wrench 30.

It is desired to draw the two brake surfaces against each other with a predetermined force so as to exert a predetermined braking effect. For this purpose, a shank 50 rises from the second brake body and terminates in an external thread 51 to which a nut 52 is threaded and held in place by a pin 53. A pair of back-up washers 54, 55 compress between them a stack of Belleville washers 56. The compression on this stack can be adjusted by tightening down nut 52. This stack of Belleville washers provides an axial force, tending to press the brake surfaces against each other to determine the resistance of wrench 30 to turning. The properties of the Belleville washers are similar to those of a spring, and are especially suited for this use, although springs themselves could be used instead, if desired. The Belleville washers are sometimes also referred to as spring means. Whatever the means used to press the braking surfaces together (herein sometimes known as "brake load means"), these brake load means are a unitary body and may bodily be removed and replaced from the cartridge by another stack of the same characteristics or of different characteristics.

For example, a change in the "spring-constant" can result in a greater or lesser force on the brake surfaces and thereby vary the braking force. In addition to these elements, brake bias means is disposed between structure connected to the frame (the case) and the unitary assembly comprising the brake load means and the two brake bodies so as to bias the unitary assembly toward wrench 30 and the wrench itself toward the fastener. This brake bias means comprises a spring 60 which bears between the case and a washer 61 which overhangs back-up washer 54. A snap ring 62 holds the brake bias means in the case when the case is removed from the frame.

The operation of this device will now be described. First, socket 27 of a selected size is snapped onto the end of shaft 25, and wrench 30 of proper size is also provided, the case with the unitary assembly therein is placed over neck 40, and pins 42 are pressed in place. Then the driver is engaged to the pin and to the collar. The pin will be pressed downwardly by the brake bias means so as readily to contact the end of the pin 10 and wrench 30, and then axial pressure by the operator will cause the socket to engage the collar. Then the portable power tool is energized and shaft 25 is turned to tighten down the collar. During this time, wrench 30 is restrained against rotation by the brake means. Should the torque exceed a predetermined value, then the reaction with the frame will overcome the resistance of the brake and permit rotation of the wrench so it will not be twisted off. This can occur either at the time the release shock is exerted on the fastener, or, should a common nut be driven, when the torque becomes too great. While end loading will add to the compression of the stack of Belleville washers, it is to be remembered that there is also resilience in the brake bias spring which itself need not be particularly strong, so that this phenomenon is minor in its effect.

This invention thereby provides a driver means with readily substituted brake means for a restrained rotatable element the brake force of which can readily be standardized in the tool room and be free of any requirements of standardization or adjustment in the shop.

This invention is not to be limited by the embodiment shown in the drawings and described in the description which is given by way of example and not of limitation, but only in accordance with the scope of the appended claims.

I claim:

1. A unitarily removable brake for providing a braking effect for a fastener-setting driver which braking effect is utilizable from a single end thereof, said driver being adapted to set threaded fasteners by means of a driven rotatable element and a restrained rotatable element, each of said elements being adapted to engage a respective portion of a fastener to be set, whereby relative counter-rotation between the two elements sets the fastener, said driver including a frame, and said brake comprising: a pair of brake bodies; a non-cylindrical brake surface on each of said bodies; said brake surfaces being so disposed and arranged as to abut each other in surface-to-surface engagement; rotational restraint means restricting a first one of said brake bodies against rotation relative to the frame, the second of said brake bodies being free to rotate relative to the frame, subject to restraint by braking resistance developed between the brake surfaces; brake load means engaging said brake bodies and forcing the brake surfaces against each other, the brake bodies and brake load means forming a unitary assembly which is fitted to the frame and is removable therefrom as a unit; and means for engaging the second of said brake bodies to the restrained rotatable element, whereby the restrained rotatable element is restrained by the said braking resistance through said last-named means acting at a single end of the unitary assembly.

2. A brake according to claim 1 in which the brake load means comprises a spring forcing the two brake bodies together.

3. A brake according to claim 1 in which the brake load means comprises a threaded spindle on one of said brake bodies, a nut threaded onto said spindle, and spring means disposed around said spindle and in compressive opposition between the nut and the other of said brake bodies.

4. A brake according to claim 3 in which the brake surfaces are conical.

5. A brake according to claim 1 in which brake bias means is disposed between structure connected to the frame and the said unitary assembly so as to bias the said unitary assembly toward one of said elements.

6. A brake according to claim 5 in which the brake bias means withdraws to permit movement of the restrained rotatable element and the unitary element to shift axially relative to the driven rotatable element.

7. A brake according to claim 5 in which the said structure includes a case adapted to be removably attached to the frame, and in which said brake bias means comprises a spring which bears against the brake load means.

8. A brake according to claim 7 in which the brake load means comprises a threaded spindle on one of said brake bodies, a nut threaded onto said spindle, and spring means disposed around said spindle and in compressive opposition between the nut and the other of said brake bodies.

9. A brake according to claim 8 in which the brake surfaces are conical.

10. An attachment for a portable power tool having a power shaft, said attachment comprising: a frame attachable to said power tool; an input shaft drivingly attachable to the power shaft rotatably mounted to the frame; a driven rotatable element drivingly connected to said input shaft and mounted to the frame; a restrained rotatable element mounted to the frame coaxially with the driven rotatable element, each element being adapted to engage a respective part of a fastener to be set by relative counter-rotation of said elements; and a unitarily removable brake for providing a braking effect which is utilizable from a single end thereof, said brake comprising a pair of brake bodies, a non-cylindrical brake surface on each of said bodies, said brake surfaces being so disposed and arranged as to abut each other in surface-to-surface engagement, rotational restraint means restricting a first one of said brake bodies against rotation relative to the frame, the second of said brake bodies being free to rotate relative to the frame, subject to restraint by braking resistance developed between the brake surfaces, brake load means engaging said brake bodies and forcing the brake surfaces against each other, the brake bodies and brake load means forming a unitary assembly which is fitted to the frame and is removable therefrom as a unit, and means for engaging the second of said brake bodies to the restrained rotatable elements, whereby the restrained rotatable element is restrained by the said braking resistance through said last-named means acting at a single end of the unitary assembly.

11. An attachment according to claim 10 in which the brake load means comprises a spring forcing the two bodies together.

12. An attachment according to claim 10 in which the brake load means comprises a threaded spindle on one of said brake bodies, a nut threaded onto said spindle, and spring means disposed around said spindle and in compressive opposition between the nut and the other of said brake bodies.

13. An attachment according to claim 10 in which the brake surfaces are conical.

14. An attachment according to claim 10 in which brake bias means is disposed between structure connected to the frame and the said unitary assembly so as to bias the said unitary assembly toward one of said elements.

15. A brake according to claim 14 in which the brake bias means withdraws to permit movement of the restrained rotatable element and the unitary element to shift axially relative to the driven rotatable element.

16. A brake according to claim 14 in which the said structure includes a case adapted to be removably attached to the frame, and in which said brake bias means comprises a spring which bears against the brake load means.

17. A brake according to claim 16 in which the brake load means comprises a threaded spindle on one of said brake bodies, a nut threaded onto said spindle, and spring means disposed around said spindle and in compressive opposition between the nut and the other of said brake bodies.

18. A brake according to claim 17 in which the brake surfaces are conical.

References Cited
UNITED STATES PATENTS

| | | | |
|---|---|---|---|
| 2,882,773 | 4/1959 | Wing | 81—56 |
| 3,012,456 | 12/1961 | Dracka | 192—56 |
| 3,020,789 | 2/1962 | Etzkorn | 192—56 |
| 3,247,741 | 4/1966 | Batton | 81—56 |
| 3,235,050 | 2/1966 | Schoppe | 192—150 |

MARTIN P. SCHWADRON, *Primary Examiner.*

C. LEEDOM, *Assistant Examiner.*